US005199309A

United States Patent [19]

Isozumi

[11] Patent Number: 5,199,309

[45] Date of Patent: Apr. 6, 1993

[54] STARTER UNIT

[75] Inventor: Shuzou Isozumi, Hyogo, Japan

[73] Assignee: Mitsubishi Denki K.K., Tokyo, Japan

[21] Appl. No.: 808,615

[22] Filed: Dec. 17, 1991

[30] Foreign Application Priority Data

Dec. 28, 1990 [JP] Japan ..................................... 2-417243

[51] Int. Cl.[5] ......................... F02N 15/06; F16H 1/32; F16H 35/10

[52] U.S. Cl. ......................................... 74/7 E; 74/7 C; 475/318

[58] Field of Search .................. 74/7 E, 7 C; 475/263, 475/264, 265, 317, 318

[56] References Cited

U.S. PATENT DOCUMENTS

| | | | |
|---|---|---|---|
| 4,494,414 | 1/1985 | Hamano | 475/263 X |
| 4,528,470 | 7/1985 | Young et al. | 475/263 X |
| 4,635,489 | 1/1987 | Imamura et al. | 475/265 X |
| 4,831,895 | 5/1989 | Tanaka et al. | 192/107 R X |

FOREIGN PATENT DOCUMENTS 49-111641 9/1974 Japan .

*Primary Examiner*—Allan D. Herrmann
*Attorney, Agent, or Firm*—Sughrue, Mion, Zinn, Macpeak & Seas

[57] ABSTRACT

In a starter unit, the internal gear frame of an epicycle reduction gear is set rotatable with respect to the front bracket, and a first over-running clutch is made up of a clutch outer fixed to the front bracket, and a clutch inner which is the front end portion of the internal gear frame, and a second over-running clutch which is a conventional over-running clutch is mounted on the output shaft. The provision of the two over-running clutches eliminates the difficulty that, when the start switch is turned on during the inertial rotation of the engine or starter unit, the pinion is reengaged with the ring gear, so that abnormal shock is applied to the side of the starter unit to damage the rotation transmitting members.

3 Claims, 2 Drawing Sheets

STARTER UNIT

BACKGROUND OF THE INVENTION

This invention relates to a starter unit in which the rotation of the armature shaft of a DC motor is transmitted through an epicycle reduction gear to the output shaft, and the rotation of the output shaft is transmitted to an over-running clutch to start the engine.

One example of a conventional starter unit is shown in FIG. 5.

In FIG. 5, reference numeral 1 designates a DC motor with an armature 2 from which an armature shaft 5 is extended. A small gear, namely, a sun gear 5*a* is formed on the front end portion of the armature shaft 5. The DC motor 1 includes a yoke 6, on the inner cylindrical wall of which field magnets are mounted. The yoke 6 is coupled to a front bracket 8 and a rear bracket 9.

Further in FIG. 5, reference numeral 10 designates an output shaft which is coupled through a steel ball 11 to the armature shaft 5 in such a manner that it is in alignment with the armature shaft 5. More specifically, the front end portion of the armature shafts is engaged, through a bearing 13, with a hole formed in the end face of the rear end face portion of the output shaft 10. The starter unit further comprises: an epicycle reduction gear 15 which is designed as follows: A plurality of planet gears 16 are mounted through bearings 18 on supporting pins 17, respectively, and engaged with the sun gear 5*a*. The supporting pins 17 are embedded in a carrier 10*a* which is in the form of a flange formed at the rear end of the output shaft 10. An internal gear frame 19 is secured to the inner cylindrical wall of the front bracket 8. An internal gear 19*a* a is formed in the inner cylindrical wall of the internal gear frame 19. The internal gear 19*a* is engaged with the planet gears 16 to revolve around the latter. The rear end portion of the output shaft 10 is supported through a bearing 21 on the inner cylindrical wall of the front end portion of the internal gear frame 19.

The starter unit further comprises: an over-running clutch 22 which is designed as follows: The over-running clutch 22 has a clutch outer member 23 and a clutch inner member 24. The clutch outer member 23 has a helical spline gear 23*a* formed in its inner cylindrical wall in such a manner that the helical spline gear 23*a* is engaged with a helical spline gear 10*b* forme on the output shaft 10. The clutch inner member 24 transmits rotation through rollers 25 to the clutch outer member 23 in one direction, and is mounted through a bearing 29 on the output shaft 10. The front end portion of the clutch inner member 24 is formed into a pinion 26, which is engaged with the ring gear of the engine as the over-running clutch 22 is moved forwardly. Engaging rings 27 and 28 are secured to the clutch outer member 23. A stopper 30 is mounted on the output shaft 10, to regulate the forward position of the over-running clutch 22.

An electromagnetic switch 31 is mounted on the front bracket 8. A hook 33 is fixedly inserted into a plunger 32, which is the movable iron core of the electromagnetic switch 31, in such a manner that the front end portion of the hook protrudes outside of the electromagnetic switch 31. A shift lever 34 in the form of a fork is engaged with the hook 33 and the aforementioned engaging rings 27 and 28. More specifically, the two prongs of the shift lever 34 are engaged with the hook 33, and the base of the two prongs is engaged with the engaging rings 27 and 28 in the axial direction. The shift lever 34 has a protruded middle portion 34 a which is supported on the front bracket 8 in such a manner that the shift lever can be pivoted about the middle portion 34*a*. An elastic closing member 35 is fitted in a cut formed in the front bracket 8.

The operation of the conventional starter unit thus constructed will be described with reference to the engine on a motor vehicle. When the engine start switch is turned on, the exciting coil (not shown) in the electromagnetic switch 31 is energized to retract the plunger 32 inwardly. The retraction is transmitted, through the hook 33 to the shift lever 34, so that the shift lever 34 is swung counterclockwise in FIG. 5 thereby to move the over-running clutch 22 forwardly. As a result, the pinion 26 is engaged with the ring gear of the engine. At the same time, or when the plunger is retracted as described above, a movable contact (not shown) is moved backwardly to engage with a pair of stationary contacts (not shown) thereby to complete the armature circuit in the DC motor 1. As a result, the armature 2 is rotated. The rotation of the armature 2 is transmitted through the epicycle reduction gear 15 to the output shaft 10. The rotation of the output shaft 10 is transmitted through the over-running clutch 22 to the pinion 26, to rotate the ring gear of the engine.

When the engine is started, the high speed rotation drives the pinion 26 in the same direction; however, it is not transmitted to the armature shaft because the over-running clutch is interposed therebetween.

The above-described conventional starter unit suffers from the following difficulty: If, during the inertial rotation of the engine or starter unit, the start switch is turned on to operate the electromagnetic switch 31, the pinion is engaged with the ring gear again, thus applying an abnormal shock to the starter unit. In this case, the rotation transmitting members may be damaged because the over-running clutch 22 is insufficient in shock absorbing capacity.

SUMMARY OF THE INVENTION

Accordingly, an object of this invention is to eliminate the above-described difficulty accompanying a conventional starter unit. More specifically, an object of the invention is to provide a starter unit which is free from the difficulty that, when the start switch is turned on during the inertial rotation of an engine or starter unit, the pinion is reengaged with the ring gear so that abnormal shock is applied to the side of the starter unit to damage the rotation transmitting members.

The foregoing object and other objects of the invention have been achieved by the provision of a starter unit which, according to the invention, comprises:

an epicycle reduction gear for reducing the speed of rotation of the armature shaft of an electric motor through revolution of planet gears;

an output shaft supporting the planet gears to which the rotation thus speed-reduced is transmitted;

a first over-running clutch comprising a clutch inner member which is the cylindrical front end portion of an internal gear frame in the epicycle reduction gear, and a clutch outer member which is coupled to the clutch inner through rollers, and secured to a bracket of the electric motor, the internal gear frame being fixed by rotation of the armature shaft, to rotate the output shaft in one direction with the aid of the planet gears;

a second over-running clutch mounted on the output shaft in such a manner as to be slidable in an direction of axis of the output shaft, the second over-running clutch comprising a clutch outer member helical-spline-mounted on the output shaft, and a clutch inner member coupled through rollers to the clutch outer in such a manner as to be rotated in one direction; and a pinion formed on the front end portion of the clutch inner member the second over-running clutch, the pinion being engaged with the ring gear of an engine as the second over-running clutch is moved forwardly, to transmit the rotation of the armature shaft thereto.

In the starter unit, as the armature shaft is rotated, the internal gear frame tends to rotate through the planet gears of the epicycle reduction gear; however, it is substantially fixed because it serves as the clutch inner member of the first over-running clutch. Thus, the planet gears revolve to rotate the shaft in the same direction. The rotation of the output shaft is transmitted through the second over-running clutch to the pinion. That is, the provision of the first and second over-running clutches increases the shock absorbing capacity. Thus, even when the pinion is reengaged with the ring gear to cause the engine to apply abnormal shock to the pinion, the relevant rotation transmitting members are prevented from damage.

The starter unit may be so modified that the first over-running clutch has a greater drag torque than the second over-running clutch. With the starter unit, when the pinion is driven by the engine being reengaged with the ring gear of the engine, the second over-running clutch idles, and the clutch inner member of the first over-running clutch, namely, the internal gear frame is not rotated. That is, the internal gear frame, which produces great centrifugal force, will not be turned at high speed, and therefore the engaged components are not excessively heated nor do they produce abnormal noises.

In addition, the starter unit may be so modified that the first over-running clutch is greater in mechanical strength than the second over-running clutch. When the pinion is driven by the engine being reengaged with the ring gear of the engine, the clutch inner member of the first over-running clutch is not rotated. Therefore, the rollers 47 depress the same parts, thus providing excessively large contact stress. This difficulty is eliminated by the fact that the mechanical strength of the first over-running clutch is greater than that of the second over-running clutch.

The nature, utility and principle of the invention will be more clearly understood from the following detailed description and the appended claims when read in conjunction with the accompanying drawings.

DETAILED DESCRIPTION OF THE INVENTION

One preferred embodiment of this invention will be described with reference to the accompanying drawings.

Figure 1:
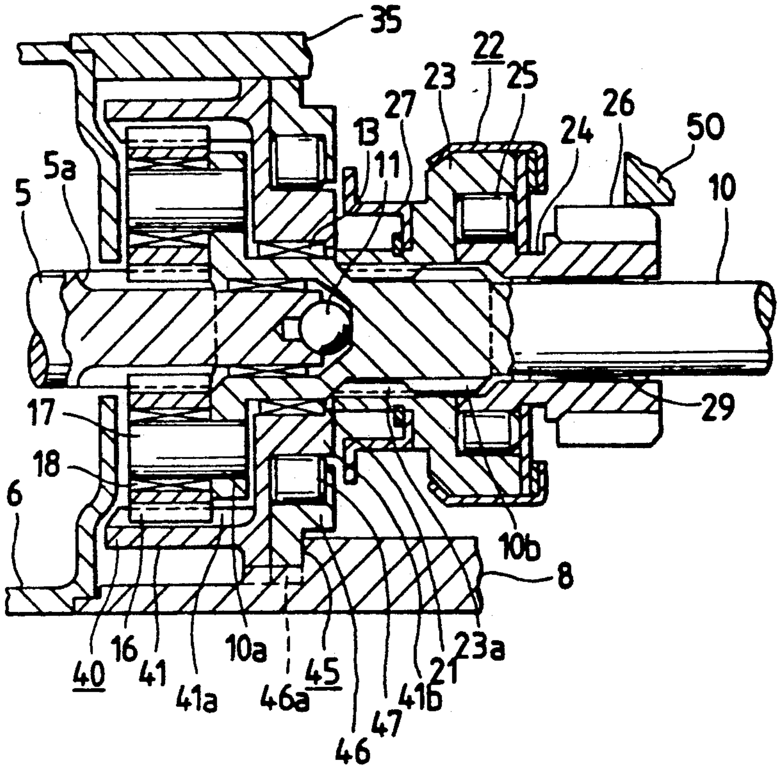
FIG. 1 is a sectional view showing essential components of an example of a starter unit according to this invention.
Figure 5:
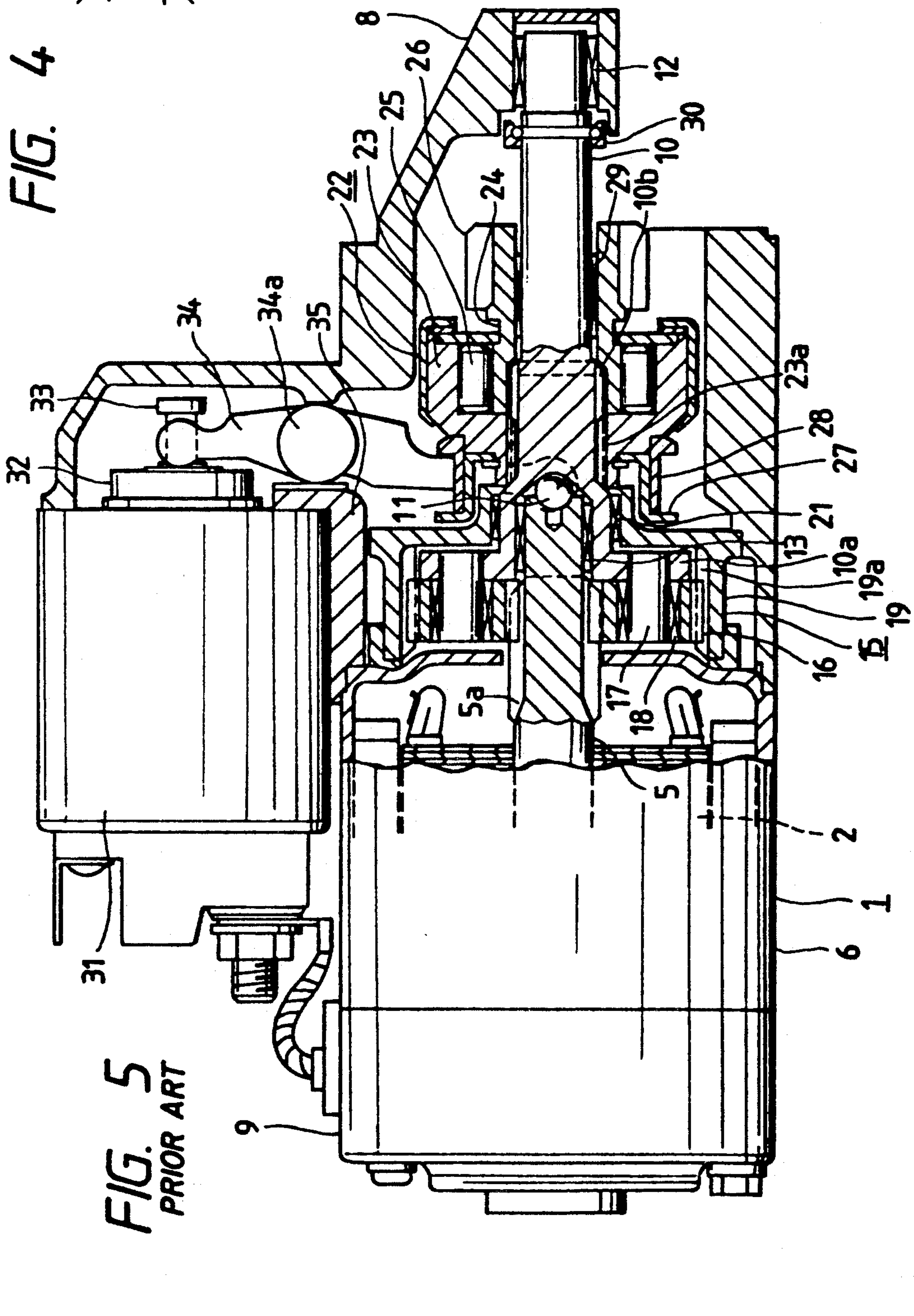
FIG. 5 PRIOR ART
FIG. 5 is a longitudinal sectional view showing a conventional starter unit.

FIG. 1 shows an example of a starter unit according to this invention. In FIG. 1, reference characters 5, 5*a*, 10, 10*a*, 10*b*, 11, 13, 16 through 18, 21, 22 through 27, 23*a* and 35 designate the same components as those in FIG. 5. The starter unit comprises the same DC motor and electromagnetic switch (not shown) as the above-described conventional starter unit. The starter unit comprises an epicycle reduction gear 40 which is made up of: a sun gear 5*a*; planet gears 16; supporting pins 17 on which the planet gears 16 are mounted through bearings 18, the supporting pins 17 being fixedly embedded in the carrier 10*a*; and an internal gear frame 41 having an internal gear 41*a* formed in the inner cylindrical wall. The internal gear frame 41 is rotatably fitted in the front bracket 8.

The starter unit further comprises an over-running clutch 45 (hereinafter referred to as "a first clutch 45", when applicable) which is designed as follows: The front cylindrical portion of the internal gear frame 41 is employed as a first clutch inner member 41*b*. A first clutch outer member 46, fixedly secured to the inner wall of the front bracket 8, is engaged through a plurality of rollers 47 with the above-described first clutch inner member 41*b*. A second over-running clutch 22 (hereinafter referred to as "a second clutch", when applicable) is mounted on the output shaft 10. The second over-running clutch 22 is the same as the overrunning clutch in the above-described conventional starter unit.

Figure 2:
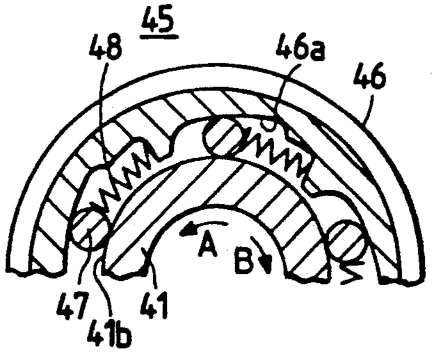
FIG. 2 is a cross sectional view of a first over-running clutch in the starter unit according to the invention.

The first clutch 45 is as shown in FIG. 2. The inner surface of the first clutch outer member 46 is formed into wedge surfaces 46*a* which accommodate rollers 47, respectively. Each of the wedge surfaces 46*a* is smaller in radial distance in the direction of the arrow A. The clutch outer has compression springs 48 which push the rollers 47 against the wedge surfaces 46*a*, respectively. This structure of the first clutch outer member inhibits the first clutch inner member 41*b* from rotating in the direction of the arrow A, and the internal gear frame 41 is fixed, and the planet gears 16 are revolved. As a result, the speed-reduced rotation is transmitted to the output shaft 10. When the engine is started, high speed rotation is applied to the pinion 26 from, the ring gear 50 of the engine, so that the high speed rotation is applied through the second clutch 22 to the output shaft 10. Even if, in this case, revolving motion is applied to the planet gears 16, the clutch inner 41*b* of the first clutch 45, namely, the force of reaction makes the internal gear frame 41 rotatable in the direction of the arrow B; that is, the internal gear frame 41 idles, and the planet gears 16 idle also. Thus, the high speed rotation is not transmitted to the armature shaft 5.

Figure 3:
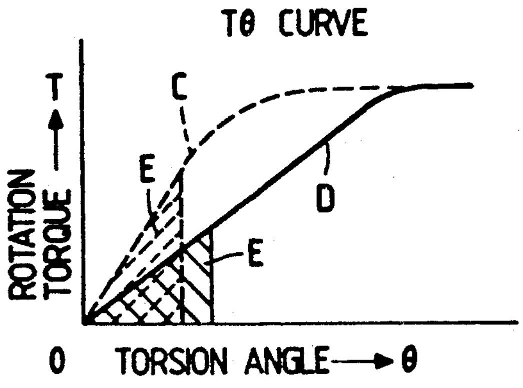
FIG. 3 is a graphical representation indicating $T\theta$ curves in the case of a conventional starter unit employing one over-running clutch and in the case of the starter unit of the invention employing two over-running clutch.

FIG. 3 shows $T\theta$ curves of clutch, where T is the rotation torque and $\theta$ is the angle of torsion. The curve C indicated by the dotted line is for the conventional starter unit with only one clutch, and the curve D indicated by the solid line is for the starter unit of the invention which employs two clutches. With a shock energy E, the case where one clutch is employed corresponds to the region hatched with broken lines, whereas the case where two clutches are employed corresponds to the region hatched with solid lines because the angle of torsion $\theta$ is larger. Thus, in the latter case, the shock torque is smaller. In the case where two clutches are used in series, the total shock absorbing energy is 2E, where E is the shock absorbing energy of each of the two clutches; that is, the shock absorbing capacity is increased.

Figure 4:
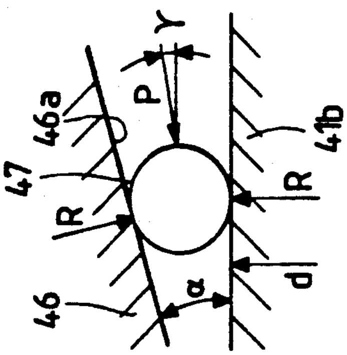
FIG. 4 is an explanatory diagram for a description of the drag torque of the first over-running clutch in the starter unit according to the invention.

The above-described starter unit may be so modified that the drag torque of the first clutch 45 is greater than that of the second clutch 22. The drag torque $T_d$ can be expressed by the following Equation (1) referring to FIG. 4.

$$T_d = R\, n\, r\, \mu \quad (1)$$

where
R: force applied to the clutch inner outside diameter $$R = P[\cos(\gamma - \alpha)] / \sin \alpha$$

P: roller depressing compression-spring force
n: the number of rollers
r: clutch inner outside diameter
$\mu$: coefficient of friction The drag torque $T_d$ of the first clutch 45 is made greater than that of the second clutch 22. Hence, when the pinion is rotated at high speed by the engine, the second clutch 22 idles, so that the clutch inner of the first clutch 45, namely, the internal gear frame 41 is prevented from being rotated. If the internal gear frame 41 is rotated at high speed, great forces act on various parts relevant thereto because the internal gear frame 41 thus rotated produces a great centrifugal force. As a result, the engaged components may be excessively heated or produce abnormal noises.

In addition, the above-described starter unit may be so modified that the mechanical strength of the first clutch 45 is greater than that of the second clutch 22. In the case where, as was described above, the clutch inner 41*b*, namely, the internal gear frame is prevented from being rotated, the rollers 47 depress the same parts, thus providing excessively large contact stress. This difficulty is eliminated by making the mechanical strength of the first clutch larger than that of the second clutch.

As was described above, in the starter unit according to the invention, the first over-running clutch is made up of the clutch inner which is the cylindrical front end portion of the internal gear frame, and the clutch outer fixed through the rollers, and the second over-running clutch is mounted on the output shaft. Hence, when, during the inertial rotation of the engine or starter unit, the pinion is reengaged with the ring gear of the engine during the inertial rotation of the engine or starter unit to cause the engine to apply abnormal shock to the pinion, the relevant rotation transmitting members are prevented from damage because the shock absorbing capacity is increased by the provision of the two over-running clutch. Furthermore, in the starter unit, the internal gear frame is employed as the clutch inner of the first over-running clutch. Therefore, the starter unit, employing two over-running clutches, is not larger in size than the conventional starter unit.

In one modification of the starter unit, the first over-running clutch is greater in drag torque than the second over-running clutch. Therefore, when the pinion is driver by the engine at high speed reengaging with the ring gear of the latter, the second over-running clutch idles, and the clutch inner of the first over-running clutch, namely, the internal gear frame producing a great centrifugal force is not rotated, thus producing no high temperature nor abnormal sound.

In another modification of the starter unit, the first over-running clutch is greater in mechanical strength than the second over-running clutch. This feature eliminates the difficulty that, when similarly the pinion is driven by the engine at high speed, the clutch inner of the first over-running clutch is prevented from being rotated, and therefore the clutch rollers depress the same parts, thus providing excessively large contact stress.

While there has been described in connection with the preferred embodiments of the invention, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. A starter unit comprising:
an epicyclic reduction gear for reducing the speed of rotation of the armature shaft of an electric motor through revolution of planet gears;
an output shaft supporting said planet gears to which the rotation thus speed-reduced is transmitted;
a first over-running clutch comprising a first clutch inner member which is the cylindrical front end portion of an internal gear frame in said epicyclic reduction gear, and a first clutch outer member which is coupled to said first clutch inner member through rollers and fixedly secured to a bracket of said electric motor, in which said internal gear frame is fixed relative to said first clutch outer member when said armature shaft is rotated in a first direction, so as to rotate said output shaft in said first direction with the aid of said planet gears;
a second over-running clutch mounted on said output shaft in such a manner so as to be slidable along said output shaft in an axial direction thereof, said second over-running clutch comprising a second clutch outer member helical-spline-mounted on said output shaft, and a second clutch inner member coupled through rollers to said second clutch outer member in such a manner as to be rotated in said first direction; and
a pinion formed on the front end portion of said second clutch inner member of said second over-running clutch, said pinion being engaged with the ring gear of an engine as said second over-running clutch is moved forwardly, to transmit the rotation of said armature shaft thereto.

2. A starter unit as claimed in claim 1, in which said first over-running clutch has a greater drag torque than said second over-running clutch.

3. A starter unit as claimed in claim 1, in which said first over-running clutch is greater in mechanical strength than said second over-running clutch.

* * * * *